US012054347B2

(12) United States Patent
Tatematsu

(10) Patent No.: US 12,054,347 B2
(45) **Date of Patent: *Aug. 6, 2024**

(54) FEED DEVICE

(71) Applicant: BROTHER KOGYO KABUSHIKI KAISHA, Nagoya (JP)

(72) Inventor: Yuya Tatematsu, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 218 days.

This patent is subject to a terminal disclaimer.

(21) Appl. No.: 17/702,726

(22) Filed: Mar. 23, 2022

(65) Prior Publication Data

US 2022/0212888 A1 Jul. 7, 2022

Related U.S. Application Data

(63) Continuation of application No. PCT/JP2020/036238, filed on Sep. 25, 2020.

(30) Foreign Application Priority Data

Sep. 30, 2019 (JP) ................................ 2019-180734

(51) Int. Cl.
*B65H 19/12* (2006.01)
*B41J 15/08* (2006.01)
(Continued)

(52) U.S. Cl.
CPC .............. *B65H 19/12* (2013.01); *B41J 15/08* (2013.01); *B41J 15/10* (2013.01); *B41J 15/12* (2013.01);
(Continued)

(58) Field of Classification Search
CPC ...... B65H 16/00; B65H 16/005; B65H 16/02; B65H 16/028; B65H 16/08; B65H 16/10;
(Continued)

(56) References Cited

U.S. PATENT DOCUMENTS 5,072,306 A * 12/1991 Matsumoto ........ H04N 1/00567 399/385
5,230,576 A * 7/1993 Sone ...................... B41J 15/042 400/613

(Continued)

FOREIGN PATENT DOCUMENTS

JP 5-333634 A 12/1993
JP 7-187495 A 7/1995

(Continued)

OTHER PUBLICATIONS

International Search Report issued in corresponding International Patent Application PCT/JP2020/036238, mailed Dec. 8, 2020.

(Continued)

*Primary Examiner* — Michael R Mansen
*Assistant Examiner* — Raveen J Dias
(74) *Attorney, Agent, or Firm* — Merchant & Gould P.C.

(57) ABSTRACT

A feed device includes: a feed tray configured to accommodate a roll, in which a medium is rolled in a roll shape, rotatably; a housing configured to support the feed tray installable; and a pull-back mechanism configured to pull back the medium unrolled from the roll in a direction orthogonal to a rotation axis of the roll in conjunction with an outward movement of the feed tray from the housing in the direction orthogonal to the rotation axis of the roll.

12 Claims, 9 Drawing Sheets

(51) Int. Cl.

| | |
|---|---|
| ***B41J 15/10*** | (2006.01) |
| ***B41J 15/12*** | (2006.01) |
| ***B41J 15/14*** | (2006.01) |
| ***B65H 16/02*** | (2006.01) |
| ***B65H 16/10*** | (2006.01) |

(52) U.S. Cl.
CPC .............. *B41J 15/14* (2013.01); *B65H 16/02* (2013.01); *B65H 16/028* (2013.01); *B65H 16/106* (2013.01); *B65H 2403/41* (2013.01); *B65H 2405/31* (2013.01); *B65H 2405/42* (2013.01)

(58) Field of Classification Search
CPC ...... B65H 16/106; B65H 19/00; B65H 19/10; B65H 19/12; B65H 19/1857; B65H 2405/42; B65H 2405/422; B65H 2301/417; B65H 2301/4171; B65H 2301/4172; B65H 2301/4175; B65H 2403/41; B65H 2405/31; B65H 2405/312; B65H 2405/20; B65H 2801/03; B65H 1/027; B65H 1/226; B41J 15/00; B41J 15/04; B41J 15/042; B41J 15/044; B41J 15/06; B41J 15/08; B41J 15/10; B41J 15/12; B41J 15/17
See application file for complete search history.

(56) References Cited

U.S. PATENT DOCUMENTS 5,440,328 A * 8/1995 Nardone .................. B41J 17/32 347/173
5,943,085 A * 8/1999 Higashi .................. B41J 11/706 347/171
6,099,179 A * 8/2000 Higashi .................... B41J 3/407 271/162
6,109,804 A * 8/2000 Higashi .................. B41J 3/4075 242/402
6,249,301 B1 * 6/2001 Kawamura ............ B41J 15/044 347/218
6,414,704 B1 * 7/2002 Yamashita ............... B41J 29/02 347/222
6,916,132 B2 * 7/2005 Otsuka ..................... B41J 11/70 400/621
7,165,741 B2 * 1/2007 Takagi ................... B41J 15/046 242/564.4
9,193,191 B2 * 11/2015 Sekino ................... B41J 15/042
9,682,577 B2 * 6/2017 Zhang .................... B65H 35/06
11,414,285 B2 * 8/2022 Takahashi ............ B65H 18/028
11,548,298 B2 * 1/2023 Kitahara .................... B41J 3/60
11,660,889 B2 * 5/2023 Takei ....................... B41J 15/04 347/104
11,701,902 B2 * 7/2023 Yamaguchi ............ B41J 15/042 347/104
11,712,908 B2 * 8/2023 Hayakawa ............... B41J 29/13 347/16
11,738,577 B2 * 8/2023 Yamaguchi ............ B41J 15/044 347/110
11,780,253 B2 * 10/2023 Yajima ..................... B41J 11/42 347/16
11,806,991 B2 * 11/2023 Yamaguchi .............. B41J 13/02
11,840,066 B2 * 12/2023 Nishikawa ............... B41J 11/66
2002/0051669 A1 * 5/2002 Otsuka ..................... B41J 15/04 400/619
2002/0130941 A1 * 9/2002 Tanaami .................. B41J 15/18 347/104
2003/0010169 A1 1/2003 Nagasawa
2004/0173706 A1 * 9/2004 Takagi ................... B41J 15/044 242/348
2005/0024464 A1 * 2/2005 Takagi ..................... B41J 15/04 347/104
2007/0147936 A1 6/2007 Ando et al.
2011/0192930 A1 * 8/2011 Horikawa ............ B65H 19/126 242/550
2011/0206439 A1 * 8/2011 Takahashi ............ B65H 19/126 242/598.3
2011/0216140 A1 * 9/2011 Yamaya ................. B41J 15/042 242/590
2011/0268488 A1 * 11/2011 Inoue ..................... B65H 19/12 400/613
2012/0043409 A1 * 2/2012 Takei ................... B65H 19/126 242/599
2012/0062678 A1 * 3/2012 Tsuji ...................... B41J 11/706 347/104
2012/0195669 A1 8/2012 Nakamura et al.
2013/0258022 A1 * 10/2013 Sekino ....................... B41J 2/32 347/104
2013/0293655 A1 * 11/2013 Sekino ..................... B41J 13/02 347/104
2014/0186086 A1 * 7/2014 Yato ....................... B41J 15/042 400/611
2016/0082751 A1 * 3/2016 Zhang ...................... B41J 11/04 225/93
2018/0282087 A1 * 10/2018 Kanazawa ............... B41J 13/10
2020/0270085 A1 * 8/2020 Takahashi .............. B41J 15/046
2021/0237492 A1 * 8/2021 Watari ............... G03G 15/6517
2021/0260898 A1 * 8/2021 Takei ....................... B41J 15/04
2021/0300090 A1 * 9/2021 Yamaguchi ............ B41J 15/044
2021/0300091 A1 * 9/2021 Yamaguchi ............ B41J 15/044
2021/0300092 A1 * 9/2021 Yajima ........................ B41J 3/60
2021/0300706 A1 * 9/2021 Tsujimura ............ B65H 35/006
2022/0063304 A1 * 3/2022 Hayakawa ............. B41J 11/706
2022/0080753 A1 * 3/2022 Kitahara ................ B41J 11/005
2022/0169051 A1 * 6/2022 Yamaguchi ............ B41J 15/042
2022/0203710 A1 * 6/2022 Yamaguchi .......... B41J 11/0045
2022/0203716 A1 * 6/2022 Noda ....................... B41J 13/02
2022/0204290 A1 * 6/2022 Tatematsu ............ B65H 3/0669
2022/0204297 A1 * 6/2022 Noda ................... B65H 3/0684
2022/0204299 A1 * 6/2022 Yamaguchi ............ B65H 20/02
2022/0234852 A1 * 7/2022 Miyase .................. B65H 35/06
2023/0065393 A1 * 3/2023 Tatematsu .............. B65H 16/08
2023/0191808 A1 * 6/2023 Hayakawa ............... B41J 15/04 347/104
2023/0348215 A1 * 11/2023 Ohhashi ................... B65H 5/06

FOREIGN PATENT DOCUMENTS

JP 2002-348011 A 12/2002
JP 2003-12167 A 1/2003
JP 2003-80778 A 3/2003
JP 2007-161456 A 6/2007
JP 2011-510883 T 4/2011
JP 2012-158442 A 8/2012
WO 2009-088443 A2 7/2009

OTHER PUBLICATIONS

International Preliminary Report on Patentability and Written Opinion of the International Searching Authority issued in corresponding International Patent Application No. PCT/JP2020/036238, dated Apr. 5, 2022.

* cited by examiner

FEED DEVICE

CROSS-REFERENCE TO RELATED APPLICATION

This is a continuation application of International Application No. PCT/JP2020/036238 filed on Sep. 25, 2020 which claims priority from Japanese Patent Application No. 2019-180734 filed on Sep. 30, 2019. The entire contents of the earlier applications are incorporated herein by reference.

TECHNICAL FIELD

The present disclosure relates to a feed device in which a feed tray which accommodates a medium is provided to be installable to and removable from a housing.

BACKGROUND

A related-art discloses two paper feed trays that are installed to be freely pulled out of a main body of an image processing device and accommodate a roll body of a medium rolled in a roll shape. The paper feed trays are disposed in two stages including an upper stage and a lower stage, and respectively include a feed-out roller that conveys the medium unrolled from the roll body, a paper feed path that guides the medium conveyed by the feed-out roller, and a cutter cutting the medium passing through the paper feed path.

SUMMARY

Illustrative aspects of the present disclosure provide a feed device that reduces occurrence of paper feed failure of a medium caused by an operation of installing and removing a feed tray to and from a housing.

A feed device of the present disclosure includes: a feed tray configured to accommodate a roll, in which a medium is rolled in a roll shape, rotatably; a housing that configured to support the feed tray installable; and a pull-back mechanism configured to pull back the medium unrolled from the roll in a direction orthogonal to a rotation axis of the roll in conjunction with an outward movement of the feed tray from the housing in the direction orthogonal to the rotation axis of the roll.

According to a feed device of the present disclosure, when a feed tray is removed from a housing, a medium unrolled from a roll is pulled back. Therefore, when the feed tray is reinstalled to the housing, a tip of the medium hardly contacts the housing and the like, such that the medium is hardly bent. Therefore, it is possible to prevent occurrence of paper feed failure of the medium caused by an operation of installing and removing the feed tray to and from the housing.

BRIEF DESCRIPTION OF DRAWINGS

Illustrative embodiments of the disclosure will be described in detail based on the following figures, wherein.

DETAILED DESCRIPTION

Since the paper feed tray described in the related art includes the cutter in addition to the feed-out roller, the paper feed tray itself has a complicated configuration. Therefore, for example, the present inventor examines simplification of the configuration of the paper feed tray itself by installing the feed-out roller and the cutter in a housing for installing the paper feed tray provided in the main body of the image processing device, or on a side of an additional housing installable to and removable from the main body of the image processing device and provided for installing the paper feed tray. As a result, the following problems are required to be considered.

When a cutting mechanism such as a cutter is provided on the housing side, a tip of the medium cut by the cutting mechanism is disposed at a position protruding above the paper feed tray. When the paper feed tray is moved in this state and removed from the housing, and then the paper feed tray is reinstalled to the housing, the tip of the medium may contact a component provided in the housing (for example, a paper feed roller and the like) such that the medium may be bent. When the medium is bent due to an operation of installing and removing the paper feed tray to and from the housing in this manner, paper feed failure may occur after the paper peed tray is installed thereon.

Therefore, illustrative aspects of the present disclosure provide a feed device that reduces occurrence of paper feed failure of a medium caused by an operation of installing and removing a feed tray to and from a housing.

Figure 1:
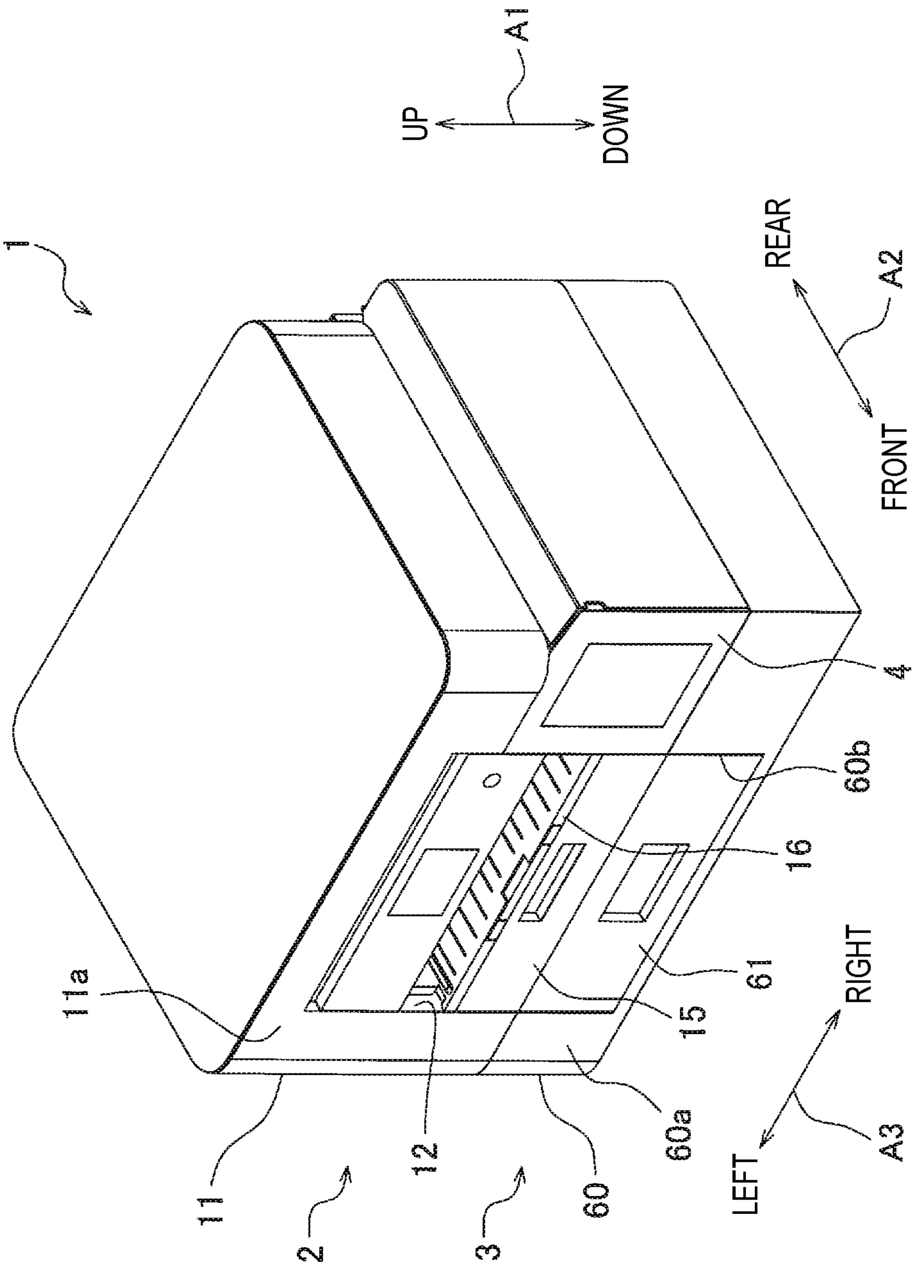
FIG. 1 is a perspective view of a printer in which a feed device according to an illustrative embodiment of the present disclosure is adopted.

Hereinafter, a printer 1 in which a feed device 3 according to an illustrative embodiment of the present disclosure is adopted will be described. The printer 1 is installed and used in a state illustrated in FIG. 1. In the illustrative embodiment, three directions indicated by arrows in FIG. 1 are an up and down direction A1, a front and rear direction A2, and a left and right direction A3. The three directions illustrated in FIG. 1 are the same in the other drawings.

Overview of Printer 1

As illustrated in FIG. 1, the printer 1 is formed in an approximately rectangular parallelepiped shape, and includes a printer main body 2 and the additional feed device 3 installed to a lower portion of the printer main body 2. The printer main body 2 includes a housing 11. An opening 12 is formed approximately in the center of a front wall 11*a* of the housing 11. A first feed tray 15 and a paper discharge tray 16 are provided in two upper and lower stages. The first feed tray 15 is configured to be insertable into and removable from the opening 12 in the front and rear direction A2, that is, to be installable to and removable from the housing 11. A cut sheet paper P1 of a desired size (for example, an A4 size) is placed on the first feed tray 15. The printer main body 2 is connectable to an external device such as a personal computer (hereinafter referred to as a PC). Next, a recording operation is executed based on a recording command from the PC. Various functions are also executed by a user operating an operation button.

As illustrated in FIG. 1, the front wall 11*a* of the housing 11 includes an opening and closing cover 4 on a right side part thereof. The opening and closing cover 4 is configured to be pivotable at a lower end portion thereof with a rotation axis (not illustrated) along the left and right direction A3 as a rotation center.

Internal Structure of Printer Main Body 2

Figure 2:
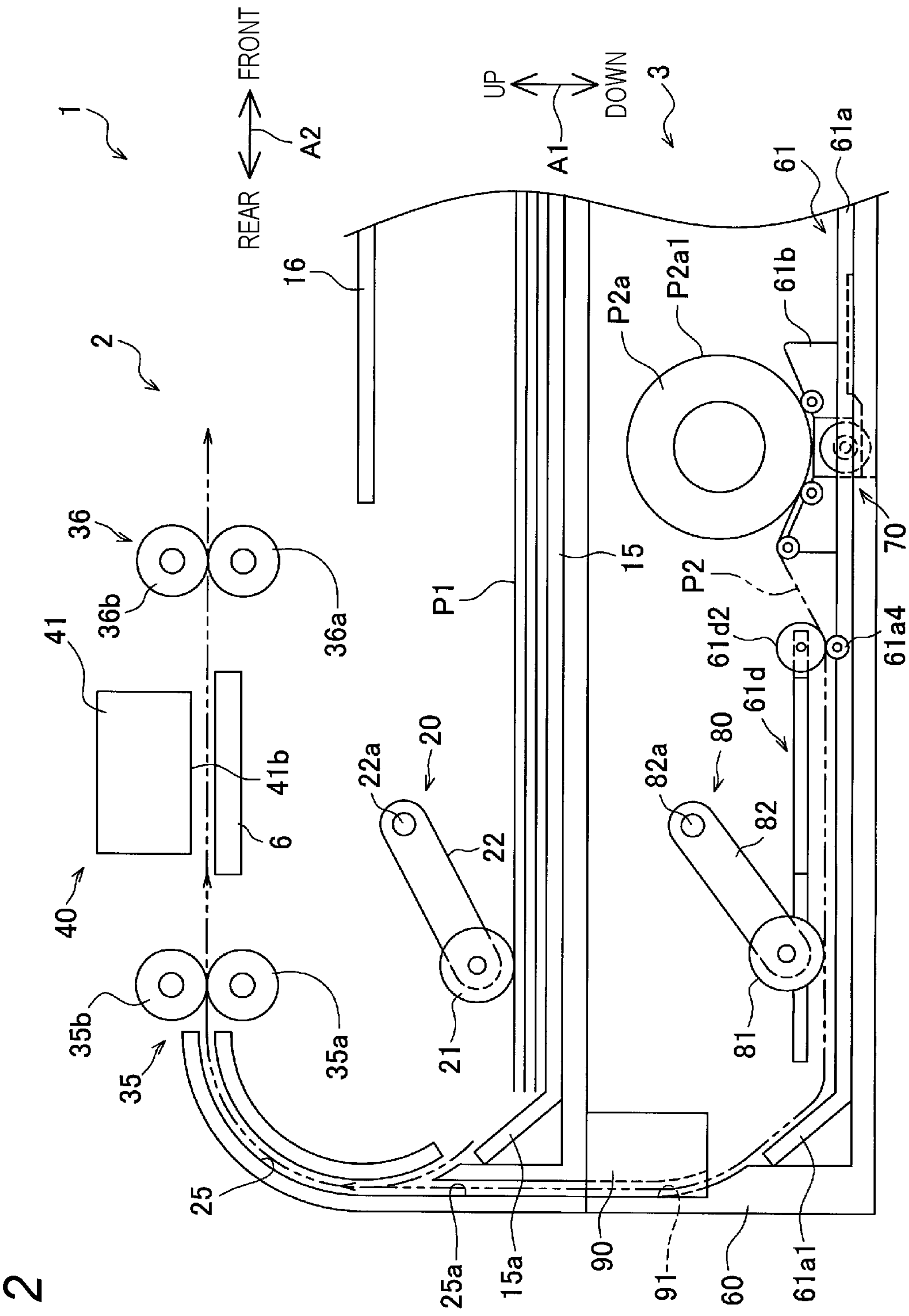
FIG. 2 is a schematic side view illustrating an internal structure of the printer illustrated in FIG. 1.
Figure 3:
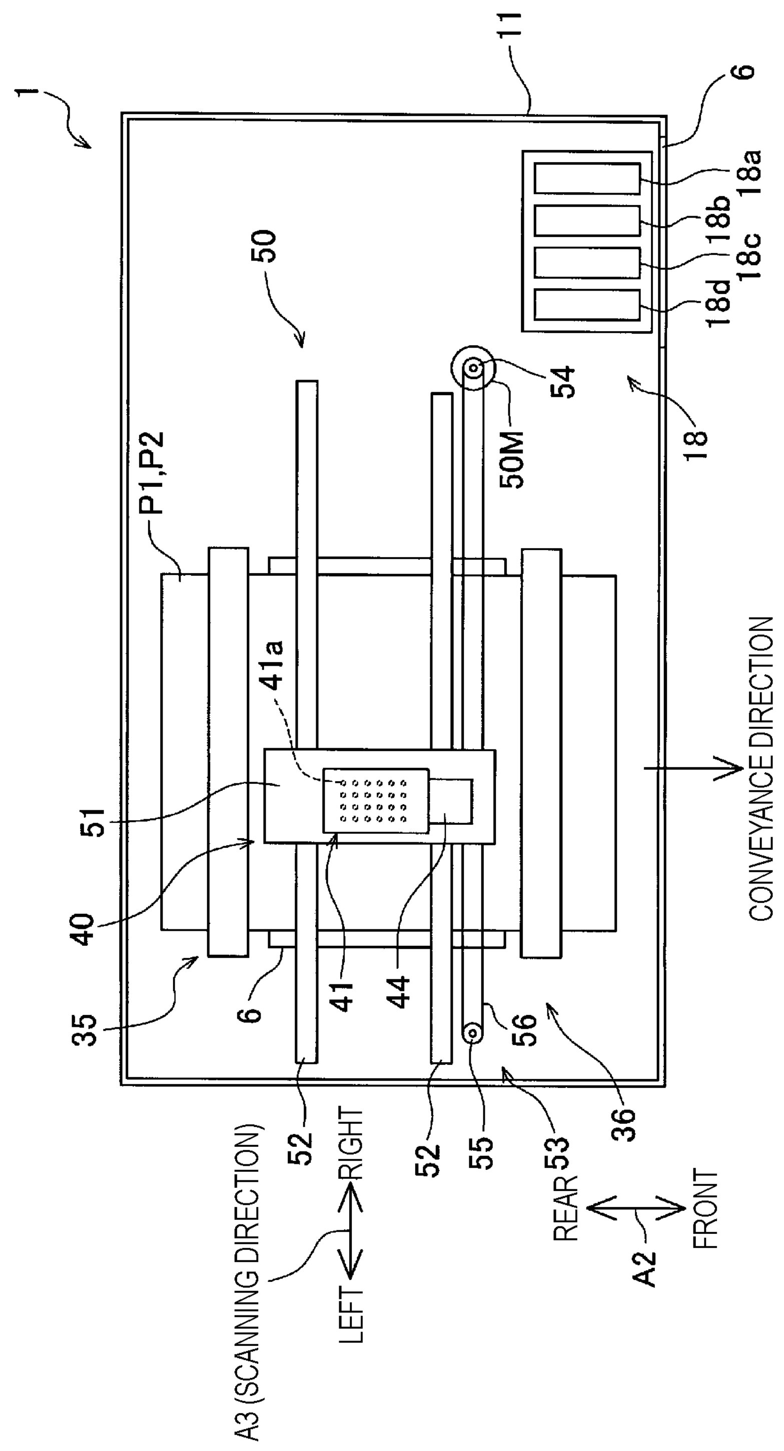
FIG. 3 is a schematic plan view of the printer illustrated in FIG. 1.

Next, an internal structure of the printer main body 2 will be described. As illustrated in FIGS. 2 and 3, the printer main body 2 includes a first feeder 20, a pair of conveyance rollers 35, a recorder 40, a tank unit 18, a pair of paper discharge rollers 36, a first auto sheet feed (ASF) motor 20M (refer to FIG. 4), a line feed (LF) motor 35M (refer to FIG. 4), and a controller 5 (refer to FIG. 4).

The first feeder 20 feeds paper P1 placed on a first feed tray 15 to a conveyance path 25. The pair of conveyance rollers 35 conveys the paper P1 fed by the first feeder 20 and a medium P2 fed from a feed device 3 via a branch path 25*a* to the recorder 40. The recorder 40 has, for example, an inkjet recording type configuration, and records an image on the paper P1 and the medium P2 conveyed by the pair of conveyance rollers 35. The pair of paper discharge rollers 36 discharges the paper P1 and the medium P2 recorded by the recorder 40 to the paper discharge tray 16.

Tank Unit 18

As illustrated in FIG. 3, the tank unit 18 includes four tanks 18*a* to 18*d*. The four tanks 18*a* to 18*d* are provided on a downstream side of the printer main body 2 in a conveyance direction and in a part on a right side in FIG. 3, and are disposed side by side in the left and right direction (a scanning direction) A3. Black, yellow, cyan, and magenta inks are stored in the four tanks 18*a* to 18*d* in order from the one located on the right side. That is, the black ink is stored in the rightmost tank 18*a*, and the color inks are stored in the other three tanks 18*b* to 18*d*. Next, the inks of the four colors stored in the four tanks 18*a* to 18*d* are supplied to an inkjet head 41 (described later) via four tubes and the like (not illustrated).

First Feeder 20

As illustrated in FIG. 2, the first feeder 20 is provided on an upper side of the first feed tray 15. The first feeder 20 includes a first paper feed roller 21 and a first arm 22. The first paper feed roller 21 is pivotally supported by a tip of the first arm 22. The first arm 22 is pivotably supported by a support shaft 22*a*, is urged by a spring or the like, and is pivoted downward so that the first paper feed roller 21 contacts the first feed tray 15. The first arm 22 is configured to be retractable upward when the first feed tray 15 is attached and detached. The first paper feed roller 21 is rotated by power of the first ASF motor 20M transmitted via a transmission mechanism (not illustrated), and the paper P1 stacked in the first feed tray 15 is fed to the conveyance path 25.

First Feed Tray 15

As illustrated in FIG. 2, the first feed tray 15 includes an inclined wall portion 15*a*. The inclined wall portion 15*a* guides the paper P1 to the conveyance path 25 when the paper P1 placed on the first feed tray 15 is fed by the first paper feed roller 21.

Conveyance Path 25

The conveyance path 25 is formed in the housing 11, and as illustrated in FIG. 2, is bent upward from a rear end portion of the first feed tray 15 and bent toward a front side of the printer 1. The paper P1 fed from the first feed tray 15 is guided by the conveyance path 25 so that the paper P1 makes a U-turn from the bottom to the top and reaches the recorder 40.

Branch Path 25*a*

The branch path 25*a* is connected to the conveyance path 25. The branch path 25*a* is also formed in the housing 11, extends in the up and down direction A1 behind the first feed tray 15, and is connected to the conveyance path 25. The medium P2 fed from the feed device 3 is guided from the branch path 25*a* to the conveyance path 25, and is guided from the bottom to the front by the conveyance path 25 to reach the recorder 40.

Pair of Conveyance Rollers 35 and Pair of Paper Discharge Rollers 36

The pair of conveyance rollers 35 includes a conveyance roller 35*a* disposed on a lower side and a pinch roller 35*b* disposed on an upper side. The conveyance roller 35*a* is rotated by power of the LF motor 35M transmitted via a transmission mechanism (not illustrated). The pinch roller 35*b* rotates with the rotation of the conveyance roller 35*a*. The conveyance roller 35*a* and the pinch roller 35*b* cooperate with each other so that the paper P1 and the medium P2 are interposed therebetween in the up and down direction A1, and convey the paper P1 and the medium P2 to the recorder 40.

The pair of paper discharge rollers 36 includes a paper discharge roller 36*a* disposed on a lower side and a spur roller 36*b* disposed on an upper side. The paper discharge roller 36*a* is rotated by the power of the LF motor 35M transmitted via the transmission mechanism (not illustrated). The spur roller 36*b* rotates with the rotation of the paper discharge roller 36*a*. The paper discharge roller 36*a* and the spur roller 36*b* cooperate with each other so that the paper P1 and the medium P2 are interposed therebetween in the up and down direction A1, and convey the paper P1 and the medium P2 to the paper discharge tray 16.

Recorder 40

As illustrated in FIGS. 2 and 3, the recorder 40 includes an inkjet head (one example of a recording head) 41, a head moving mechanism 50, and a platen 6. The head moving mechanism 50 includes a carriage 51. The carriage 51 reciprocates in the scanning direction (which is the left and right direction A3 and a direction orthogonal to the conveyance direction of the paper P1 and the medium P2). The inkjet head 41 is supported by the carriage 51.

A lower surface of the inkjet head 41 is an ejection surface 41*b* formed with a plurality of ejection ports 41*a* for ejecting ink to the paper P1 and the medium P2 conveyed below the inkjet head 41. As illustrated in FIG. 3, the plurality of ejection ports 41*a* are arranged so that the ejection port rows arranged along the conveyance direction are formed in four rows in the scanning direction. In the illustrative embodiment, black ink is ejected from the ejection ports 41*a* belonging to the rightmost ejection port row in FIG. 3, and color inks (magenta, cyan, and yellow) are ejected from the ejection ports 41*a* belonging to the ejection port rows of the other three rows. The inkjet head 41 ejects ink of each color as a minute ink droplet from the ejection ports 41*a* under the control of the controller 5 based on a recording command.

A tube joint 44 is provided to be integrated with the inkjet head 41. The inkjet head 41 and the tank unit 18 are connected to each other via four flexible tubes (not illustrated) connected to the tube joint 44, and the ink of each color is supplied to the inkjet head 41.

The platen 6 that supports the paper P1 and the medium P2 conveyed by the pair of conveyance rollers 35 is disposed below the inkjet head 41. The platen 6 is disposed in a part of reciprocating movement ranges of the carriage 51, through which the paper P1 and the medium P2 pass. Since a width of the platen 6 is sufficiently larger than a maximum width of the paper P1 and medium P2 that can be conveyed, the paper P1 and the medium P2 conveyed through the conveyance path 25 always pass on the platen 6.

As illustrated in FIG. 3, the head moving mechanism 50 includes a pair of guide rails 52 and a belt transmission mechanism 53. The pair of guide rails 52 are disposed to be separated from each other in the front and rear direction A2 and extend parallel to each other in the left and right direction A3. The carriage 51 is disposed so as to straddle the pair of guide rails 52, and is reciprocated on the pair of guide rails 52 along the left and right direction A3.

The belt transmission mechanism 53 includes two pulleys 54 and 55, an endless timing belt 56 partially fixed to the carriage 51, and a carriage motor 50M. The two pulleys 54 and 55 are disposed to be separated from each other in the left and right direction A3, and the timing belt 56 is stretched therebetween. The pulley 54 is connected to a drive shaft of the carriage motor 50M, and when the carriage motor 50M is driven, the timing belt 56 travels and the inkjet head 41 moves in the scanning direction together with the carriage 51.

The inkjet head 41 ejects the ink of each color from the ejection ports 41*a* under the control of the controller 5 based on the recording command. That is, as the carriage 51 reciprocates in the left and right direction A3, the inkjet head 41 is scanned with respect to the paper P1 and the medium P2, and an image is recorded on the paper P1 and the medium P2 conveyed on the platen 6 by ejecting the ink of each color from the ejection ports 41*a*. A linear encoder (not illustrated) having a large number of translucent portions (slits) arranged with a space therebetween in the scanning direction is provided in the printer 1. On the other hand, the carriage 51 is provided with a transmission type position detection sensor (not illustrated) including a light emitting element and a light receiving element. The printer 1 can recognize a current position of the carriage 51 in the scanning direction from a count value of the translucent portion of the linear encoder detected by the position detection sensor while the carriage 51 is moving, and rotation drive of the carriage motor 50M is controlled.

Figure 4:
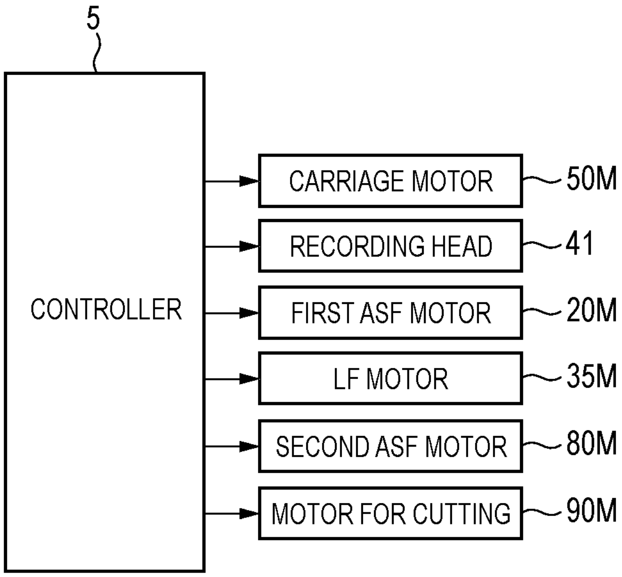
FIG. 4 is a block diagram of a controller.

As illustrated in FIG. 4, the controller 5 includes a central processing unit (CPU), a read only memory (ROM), a random access memory (RAM), an application specific integrated circuit (ASIC), and the like, and these devices cooperate with each other to control operations of the first ASF motor 20M, a second ASF motor 80M (described later), the LF motor 35M, the carriage motor 50M, the inkjet head 41, a motor for cutting 90M (described later), and the like. For example, the controller 5 controls the inkjet head 41, the first ASF motor 20M, the LF motor 35M, the carriage motor 50M, and the like based on the recording command transmitted from the PC, and records an image and the like on the paper P1. The controller 5 also controls the inkjet head 41, the second ASF motor 80M, the LF motor 35M, the carriage motor 50M, the motor for cutting 90M, and the like based on the recording command transmitted from the PC, and records an image and the like on the medium P2.

While the controller 5 of the illustrative embodiment includes one CPU and one ASIC, the controller 5 may include only one ASIC, and the one ASIC may collectively perform required processes. Alternatively, the controller 5 may include a plurality of ASICs, and the plurality of ASICs may share and perform the required processes.

Feed Device 3

As illustrated in FIGS. 1, 2, 5, and 6, the feed device 3 includes a housing 60, a second feed tray 61, a pull-back mechanism 70, a second feeder 80, and a cutting mechanism 90. The feed device 3 can rotatably accommodate a roll P2*a* which will be described later. As illustrated in FIG. 1, the housing 60 has a rectangular parallelepiped shape and is configured to be installable to and removable from the lower portion of the printer main body 2. An opening 60*b* is formed approximately at the center of a front wall 60*a* of the housing 60. The housing 60 supports the second feed tray 61. The second feed tray 61 is configured to be insertable into and removable from the opening 60*b* in the front and rear direction A2 (in an orthogonal direction), that is, to be installable to and removable from the housing 60.

Second Feed Tray 61

Figure 5:
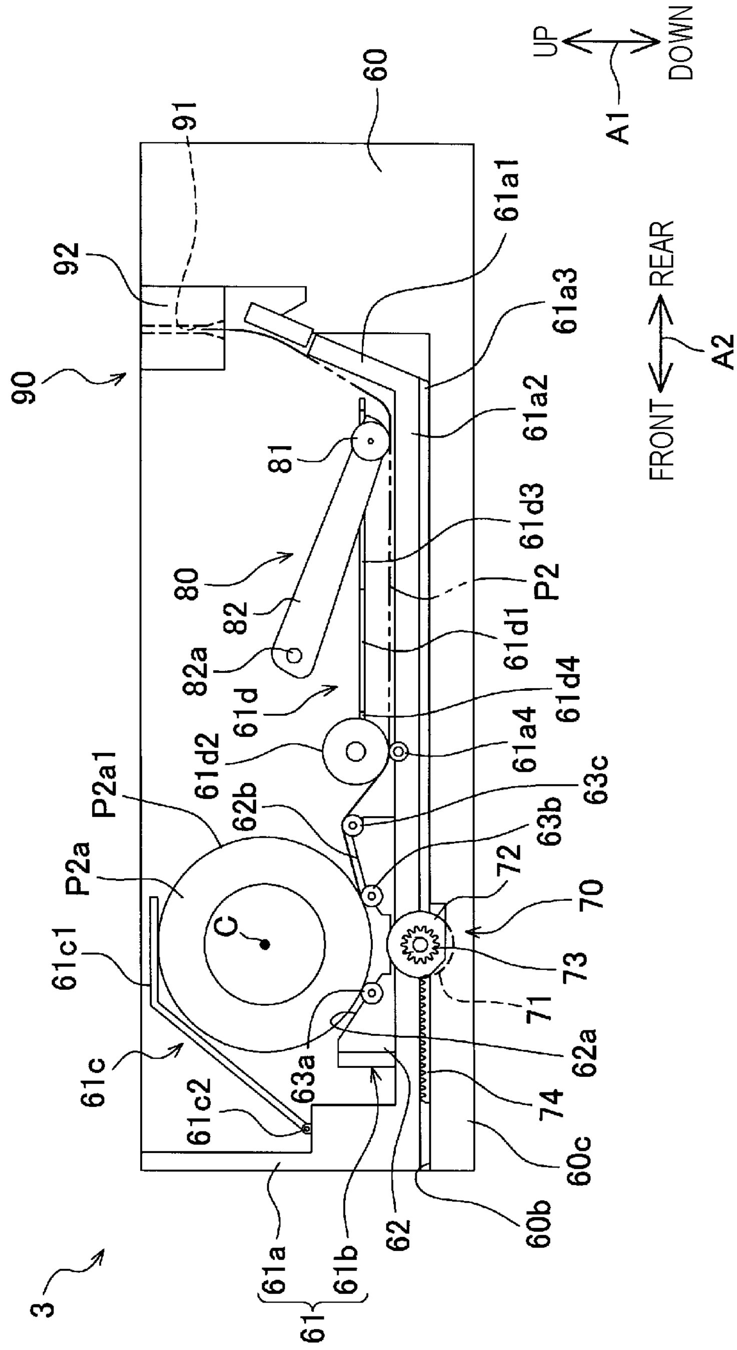
FIG. 5 is a side view illustrating an internal structure of the feed device and illustrating a fully installed state of a second feed tray on a housing.
Figure 6:
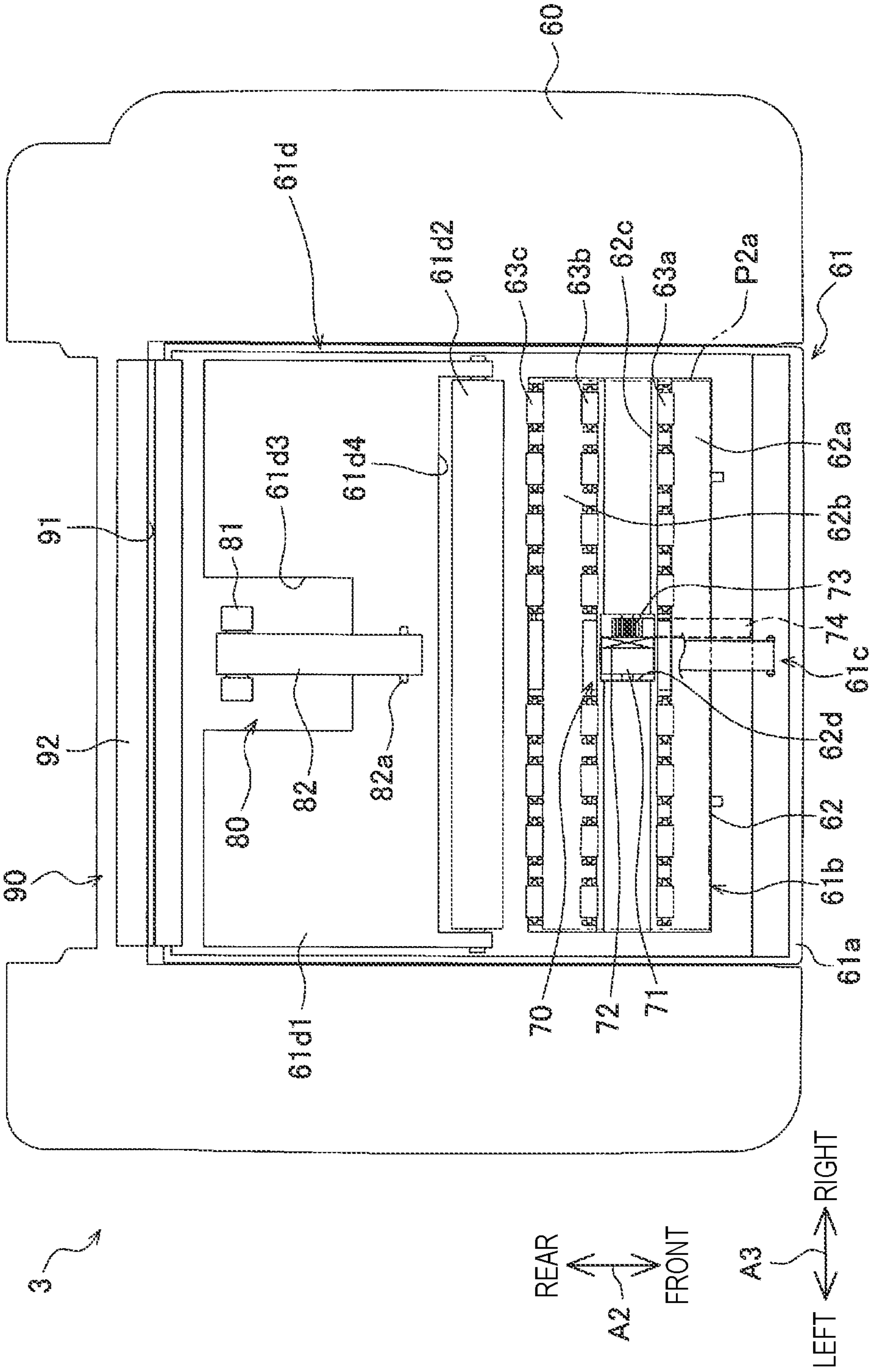
FIG. 6 is a plan view of the feed device illustrated in FIG. 1 in a state where a medium is not accommodated.

As illustrated in FIGS. 5 and 6, the second feed tray 61 includes a tray main body 61*a*, a support base 61*b* for supporting the roll P2*a* of the medium P2, and a conveyance guide 61*d*. The support base 61*b* and the conveyance guide 61*d* are configured to be installable to and removable from the tray main body 61*a*. As illustrated in FIG. 6, the tray main body 61*a* has a rectangular planar shape. The tray main body 61*a* has a planar size which can accommodate, for example, cut sheet paper having an A4 size in a state where the support base 61*b* and the conveyance guide 61*d* are removed. As illustrated in FIG. 5, the tray main body 61*a* includes an inclined wall portion 61*a*1 at a rear end portion thereof. The inclined wall portion 61*a*1 guides the medium P2 fed by the second paper feed roller 81 toward the branch path 25*a*. A presser 61*c* for pressing the roll P2*a* toward the support base 61*b* is provided at a front end portion of the tray main body 61*a*. As illustrated in FIG. 5, the presser 61*c* includes a plate-shaped member 61*c*1 bent in a dogleg shape. The plate-shaped member 61*c*1 is supported by the tray main body 61*a* so that a front end of the plate-shaped member 61*c*1 is pivotable around a rotation axis 61*c*2. Accordingly, the presser 61*c* presses the roll P2*a* toward the support base 61*b* by allowing the plate-shaped member 61*c*1 to pivot by its own weight with the rotation axis 61*c*2 as the rotation center. Therefore, even though a weight of the roll P2*a* becomes smaller as the medium P2 decreases, a slip hardly occurs between a roller 71 which will be described later and the roll P2*a*. Therefore, the roll P2*a* can be rotated by the roller 71. The plate-shaped member 61*c*1 of the presser 61*c* may press the roll P2*a* by an urging force of an urging member such as a spring. The medium P2 is paper which is the same as the paper P1, and may be cloth and the like.

As illustrated in FIGS. 5 and 6, the conveyance guide 61*d* includes a plate-shaped guide member 61*d*1 and a roller 61*d*2. As illustrated in FIG. 6, the guide member 61*d*1 has an approximately rectangular planar shape extending in the left and right direction A3, a notch portion 61*d*3 is formed in a rear center thereof, and a notch portion 61*d*4 is formed in a front side thereof. The notch portion 61*d*3 is formed so that tip portions of the second paper feed roller 81 and a second arm 82, which will be described later, can enter and exit by pivoting of the second arm 82. The roller 61*d*2 extending in the left and right direction A3 is disposed in the notch portion 61*d*4. Opposite end portions of the roller 61*d*2 in the left and right direction A3 are rotatably supported by the guide member 61*d*1. A roller 61*a*4 extending in the left and right direction A3 is rotatably supported by the tray main body 61*a*. The roller 61*a*4 is disposed at a position opposite to that of the roller 61*d*2 in the up and down direction A1. Accordingly, the medium P2 unrolled from the roll P2*a* can be interposed between the two rollers 61*a*4 and 61*d*2. Therefore, the roll P2*a* is set on the support base 61*b*, and the roller 61*d*2 is manually rotated counterclockwise in FIG. 5 in a state where the medium P2 unrolled from the roll P2*a* is interposed between the two rollers 61*a*4 and 61*d*2, such that a tip of the medium P2 is fed out up to a desired position and setting is easily performed. Here, the desired position is, for example, a position where the second feed tray 61 can contact the second paper feed roller 81 and a position in the vicinity of the rear end in FIG. 5 of the tray main body 61*a* in a fully installed state where the second feed tray 61 is fully installed to the housing 60.

As illustrated in FIGS. 5 and 6, the support base 61*b* is disposed between the center and the front end of the tray main body 61*a* in the front and rear direction A2. The support base 61*b* includes a base body 62 having an approximately rectangular parallelepiped shape extending in the left and right direction A3, and a plurality of rollers 63*a* to 63*c*. The base body 62 is formed with two inclined surfaces 62*a* and 62*b* provided on an upper surface of the base body 62 in a state where the center of the base body 62 in the front and rear direction A2 is interposed between the two inclined surfaces 62*a* and 62*b*. The inclined surface 62*a* of the two inclined surfaces 62*a* and 62*b* is disposed in a front side and the inclined surface 62*b* thereof is disposed in a rear side. The two inclined surfaces 62*a* and 62*b* are configured to incline downward as the two inclined surfaces 62*a* and 62*b* are close to each other. Eight rollers 63*a* are arranged along the left and right direction A3 at a rear end portion of the inclined surface 62*a*. Eight rollers 63*b* are arranged along the left and right direction A3 at a front end portion of the inclined surface 62*b*. Eight rollers 63*c* are arranged along the left and right direction A3 at a rear end portion of the inclined surface 62*b*. The plurality of rollers 63*a* and 63*b* contact a lower part of an outer peripheral surface P2*a*1 of the roll P2*a* of the medium P2, and support the roll P2*a* from below. The plurality of rollers 63*c* guide the medium P2 unrolled from the roll P2*a*. The plurality of rollers 63*a* to 63*c* are supported by the base body 62 so as to be rotatable around a rotation axis parallel to the left and right direction A3. Therefore, the roll P2*a* of the medium P2 can also rotate around a rotation axis C parallel to the left and right direction A3. A groove 62*c* opened upward is formed in the base body 62. As illustrated in FIG. 6, the groove 62*c* is located at the center of the base body 62 in the front and rear direction A2 and is disposed between the two inclined surfaces 62*a* and 62*b*. A penetrating portion 62*d* is formed in the center of the base body 62 in the left and right direction A3.

Pull-back Mechanism (Rotation Mechanism) 70

The pull-back mechanism 70 pulls back the medium P2 unrolled from the roll P2*a* in conjunction with an operation of removing the second feed tray 61 from the housing 60 by moving the second feed tray 61 in a direction orthogonal to the rotation axis C of the roll P2*a*. The pull-back mechanism 70 includes a rotation mechanism that rotates so as to pull back the medium P2 unrolled from the roll P2*a* in conjunction with the operation of removing the second feed tray 61 from the housing 60. In the illustrative embodiment, since the rotation mechanism itself is the pull-back mechanism 70, the rotation mechanism will be also described with the same reference sign as that of the pull-back mechanism 70. The rotation mechanism 70 includes a roller 71, a power transmission device 72, a pinion gear 73, and a rack gear 74 that can be engaged with the pinion gear 73. As illustrated in FIG. 6, the roller 71, the power transmission device 72, and the pinion gear 73 are disposed side by side in the left and right direction A3 at positions opposite to that of the penetrating portion 62*d*. The roller 71, the power transmission device 72, and the pinion gear 73 are rotatably and movably supported by a bottom portion 61*a*2 of the tray main body 61*a* in the up and down direction A1. As illustrated in FIG. 5, the roller 71 is formed to have a diameter larger than that of the pinion gear 73, and formed to have a size that allows the roller 71 to move up and down in the penetrating portion 62*d*. The roller 71 is supported to be movable between a separation position (refer to FIG. 5) at which the roller 71 is separated downward from the outer peripheral surface P2*a*1 of the roll P2*a* and a contact position (refer to FIG. 8) at which the roller 71 contacts the outer peripheral surface P2*a*1 of the roll P2*a*.

The power transmission device 72 is a known one-way clutch, and transmits a rotational force in one direction of the pinion gear 73 to the roller 71. In FIG. 5, the power transmission device 72 in the illustrative embodiment is configured to transmit the rotational force when the pinion gear 73 rotates counterclockwise to the roller 71, and configured not to transmit the rotational force when the pinion gear 73 rotates clockwise to the roller 71. The pinion gear 73 is configured to be rotatable by being engaged with the rack gear 74.

As illustrated in FIG. 5, the rack gear 74 is disposed on a bottom portion 60*c* of the housing 60, and disposed to be closer to the front than the center of the bottom portion 60*c* in the front and rear direction A2. The rack gear 74 is configured to extend along the front and rear direction A2, and to be able to be engaged with the pinion gear 73. That is, as illustrated in FIGS. 5 and 6, the rack gear 74 is disposed in front of the pinion gear 73 and is not engaged with the pinion gear 73 in the fully installed state where the second feed tray 61 is fully installed to the housing 60. On the other hand, the rack gear 74 is disposed at a position where the rack gear 74 can be engaged with a lower part of the pinion gear 73 in a half-installed state. The half-installed state refers to a state of the second feed tray 61 until the second feed tray 61 moves forward from the fully installed state and the second feed tray 61 is removed from the housing 60. The rack gear 74 is engaged with the pinion gear 73 when the second feed tray 61 moves forward from the fully installed state, thereby rotating the pinion gear 73 counterclockwise in FIG. 5. The rack gear 74 is also engaged with the pinion gear 73 when the second feed tray 61 in the half-installed state on the housing 60 moves rearward, thereby rotating the pinion gear 73 clockwise in FIG. 5. The rack gear 74 is disposed at a position at which the roller 71 can be located from the separation position to the contact position when the rack gear 74 is engaged with the pinion gear 73. As illustrated in FIG. 5, a groove 61*a*3 extending along the front and rear direction A2 is formed on a lower surface of the tray main body 61*a* such that the second feed tray 61 does not contact the rack gear 74 when the second feed tray 61 is installed to the housing 60.

Second Feeder 80

As illustrated in FIG. 5, the second feeder 80 is provided on an upper side of the second feed tray 61. The second feeder 80 includes the second paper feed roller 81 and the second arm 82. The second paper feed roller 81 is pivotally supported at a tip of the second arm 82. The second arm 82 is pivotably supported by a support shaft 82*a*, is urged by a spring or the like, and is pivoted downward so that the second paper feed roller 81 contacts the second feed tray 61. The second arm 82 is configured to be retractable to an upper retracted position (refer to FIG. 7) when the second feed tray 61 is attached to and detached from the housing 60. The second paper feed roller 81 is rotated by the power of the second ASF motor 80M transmitted via a transmission mechanism (not illustrated), and the medium P2 unrolled from the roll P2*a* accommodated in the second feed tray 61 is fed to the branch path 25*a* via the cutting mechanism 90.

Cutting Mechanism 90

As illustrated in FIGS. 5 and 6, the cutting mechanism 90 is installed in an upper rear portion of the housing 60. The cutting mechanism 90 is a known cutting mechanism that extends along the left and right direction A3 and can cut the medium P2 along the left and right direction A3. The cutting mechanism 90 includes a guide portion 92 that defines a conveyance path 91 through which the medium P2 fed by the second paper feed roller 81 passes, a cutter (not illustrated), and the motor for cutting 90M that drives the cutter (refer to FIG. 4). The cutter is configured to be movable along the left and right direction A3 and cuts the medium P2 in the conveyance path 91. The cutting mechanism 90 cuts the medium P2 fed by the second feeder 80 at a desired position under the control of the controller 5. Therefore, a tip of the cut medium P2 is disposed at a position above a tip of the second feed tray 61 (a rear end in FIG. 5). In the illustrative embodiment, the tip of the cut medium P2 is located in the conveyance path 91. In the illustrative embodiment, the cutting mechanism 90 is provided in the housing 60, and may be provided in the printer main body 2.

Operation of Rotation Mechanism 70

Next, an operation of the rotation mechanism 70 when the second feed tray 61 of the feed device 3 is attached to and detached from the housing 60 will be described below with reference to FIGS. 5 and 7 to 9. As illustrated in FIG. 5, the printer 1 is usually used when the second feed tray 61 is in the fully installed state on the housing 60. Since the medium P2 is cut by the cutting mechanism 90 when the medium P2 is used for image recording, the tip thereof exists in the conveyance path 91.

When a user pulls out the second feed tray 61 forward to remove the second feed tray 61 from the housing 60 in order to look inside the second feed tray 61, the roll P2*a* is rotated by the rotation mechanism 70, the medium P2 is rerolled, and the tip of the medium P2 moves. At this time, the second arm 82 moves to the retracted position.

Figure 7:
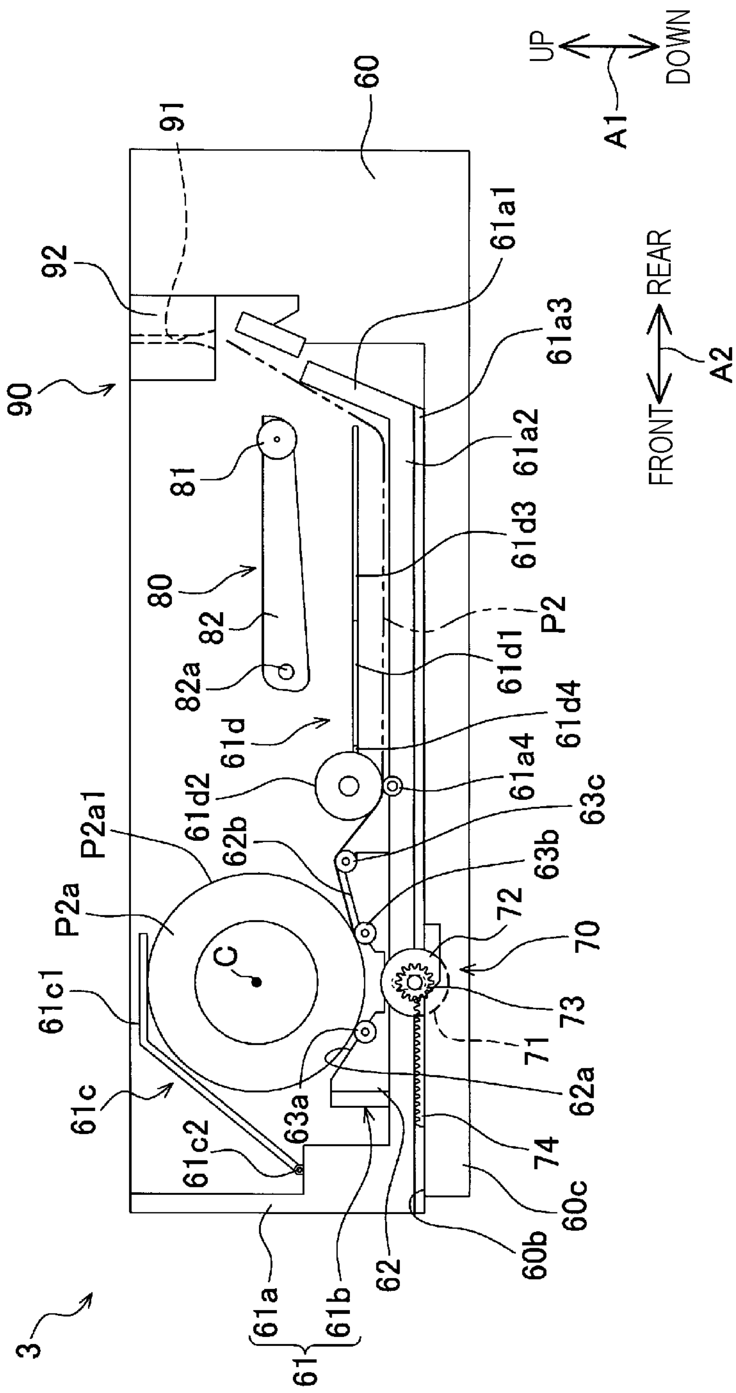
FIG. 7 illustrates the internal structure of the feed device, and is a side view when a pinion gear starts to be engaged with a rack gear in a half-installed state of the second feed tray on the housing.
Figure 8:
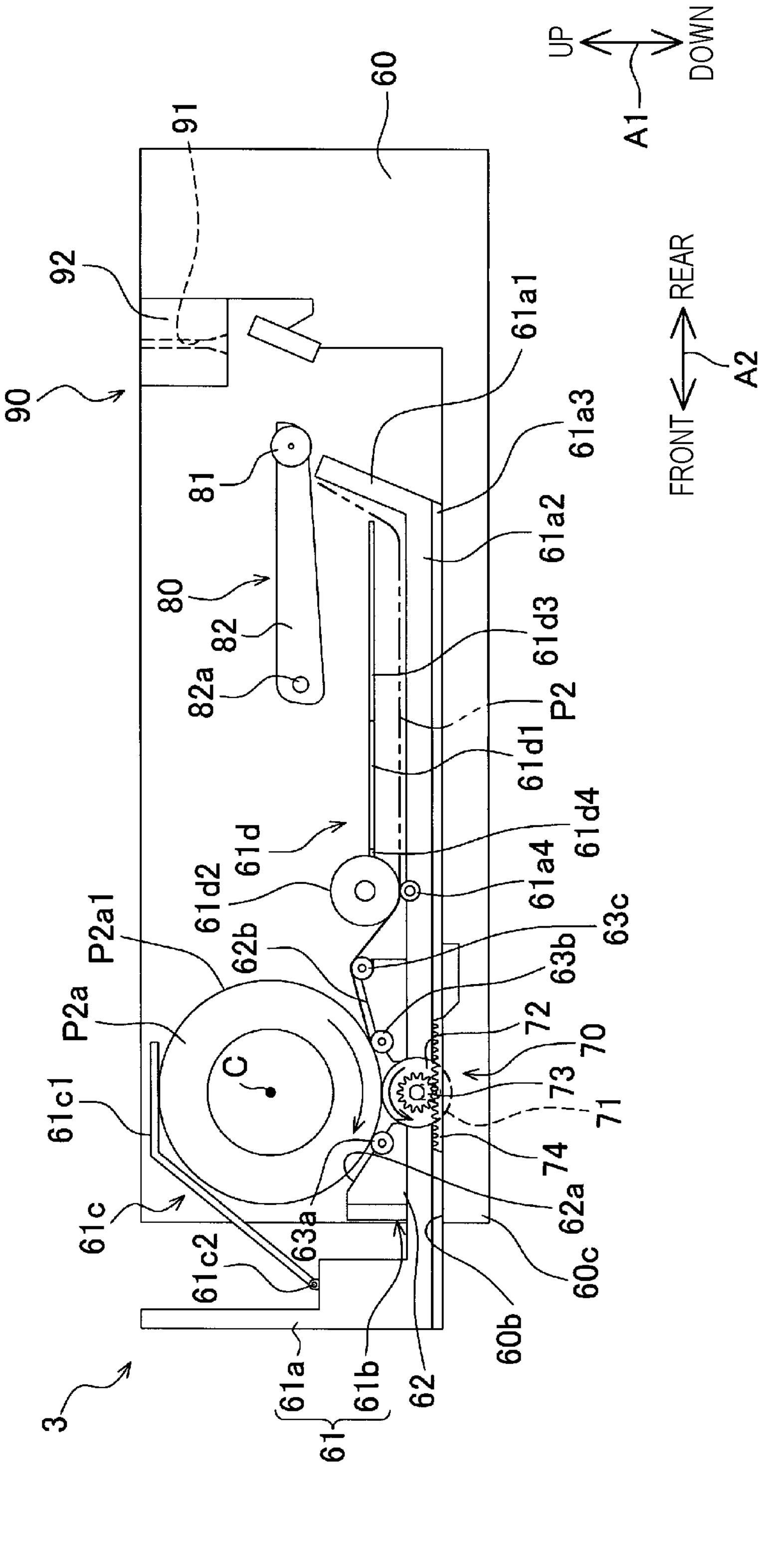
FIG. 8 illustrates the internal structure of the feed device, and is a side view when the pinion gear is engaged with the rack gear in the half-installed state of the second feed tray on the housing.

More specifically, when the second feed tray 61 moves from the fully installed state illustrated in FIG. 5 to the position illustrated in FIG. 7 in the half-installed state, the pinion gear 73 and the rack gear 74 start to be engaged with each other. Next, when the second feed tray 61 further moves forward from this state, as illustrated in FIG. 8, the pinion gear 73 moves upward while rotating counterclockwise in FIG. 8 by the engagement between the pinion gear 73 and the rack gear 74. That is, the roller 71 also moves from the separation position illustrated in FIG. 5 to the contact position illustrated in FIG. 8 together with the pinion gear 73, and rotates counterclockwise in FIG. 8. Therefore, the roller 71 contacts the outer peripheral surface P2*a*1 of the roll P2*a*, and the roll P2*a* rotates clockwise in FIG. 8 around the rotation axis C by the roller 71.

Figure 9:
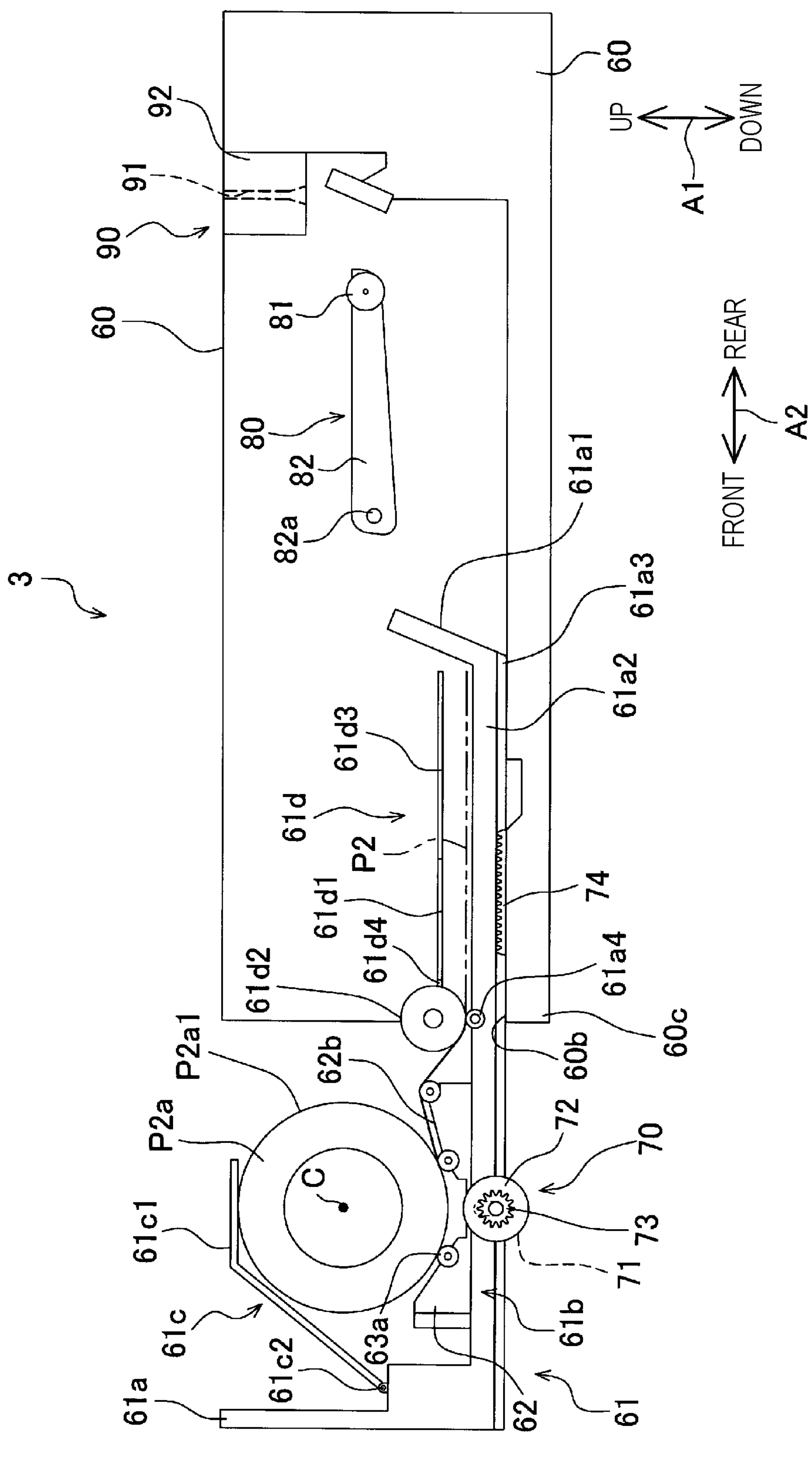
FIG. 9 illustrates the internal structure of the feed device, and is a side view when the pinion gear is located in front of the rack gear in the half-installed state of the second feed tray on the housing.

Next, when the second feed tray 61 further moves forward, the roller 71 rotates clockwise in FIG. 8 while the pinion gear 73 and the rack gear 74 are engaged with each other. After that, as illustrated in FIG. 9, the pinion gear 73 moves forward of the rack gear 74, and when the engagement therebetween ends, the rotation of the roller 71 also stops. At this time, the roller 71 moves from the contact position illustrated in FIG. 8 to the separation position illustrated in FIG. 9 together with the pinion gear 73. The roll P2*a* is rotated by the roller 71 in conjunction with the operation of removing the second feed tray 61 from the housing 60, while the pinion gear 73 is engaged with the rack gear 74. As illustrated in FIG. 9, the medium P2 is rerolled by the rotation of the roll P2*a*, such that the tip of the medium P2 is disposed between a rear end of the conveyance guide 61*d* and the tray main body 61*a*. That is, the rotation mechanism 70 is configured to rotate the roll P2*a* by pulling out the second feed tray 61 from the fully installed state up to a position where the pinion gear 73 is located in front of the rack gear 74 (a position where the engagement between the pinion gear 73 and the rack gear 74 ends), so that the tip of the medium P2 moves from the conveyance path 91 to the front of a contact point between the second paper feed roller 81 and the bottom portion 61*a*2 of the tray main body 61*a* illustrated in FIG. 5. When the second feed tray 61 is pulled out from the fully installed state up to the position where the pinion gear 73 is located in front of the rack gear 74, the rotation mechanism 70 may be able to rotate the roll P2*a* up to a position where the tip of the medium P2 is located below an upper end of the inclined wall portion 61*a*1 of the tray main body 61*a*.

After that, the second feed tray 61 is removed from the housing 60, and then the user moves the second feed tray 61 rearward and reinstalls the second feed tray 61 on the housing 60. At this time, while the pinion gear 73 and the rack gear 74 are engaged with each other and the pinion gear 73 rotates clockwise in FIG. 5, the power transmission device 72 does not transmit the rotational force of the pinion gear 73 to the roller 71 such that the roller 71 does not rotate the roll P2*a*. Therefore, the tip of the medium P2 does not move when the second feed tray 61 is installed to the housing 60, and is in a state of being located in the tray main body 61*a*, that is, below the upper end of the inclined wall portion 61*a*1. Even though the second feed tray 61 is pulled out from the housing 60 and then reinstalled to the housing 60 in this manner, the tip of the medium P2 is disposed in the tray main body 61*a*, such that the tip of the medium P2 does not contact components of the second feeder 80 and the housing 60 when the second feed tray 61 is installed thereon. Therefore, the second feed tray 61 can be installed to the housing 60 without bending the tip of the medium P2.

As described above, according to the feed device 3 of the illustrative embodiment, when the second feed tray 61 is removed from the housing 60, a part of the medium P2 unrolled from the roll P2*a* is rerolled to the roll P2*a*, and the tip of the medium P2 is pulled back from the conveyance path 91 into the second feed tray 61. Therefore, when the second feed tray 61 is reinstalled to the housing 60, the tip of the medium P2 hardly contacts the housing 60 and the like, such that the tip thereof is hardly bent. Therefore, even though the second feed tray 61 is attached to and detached from the housing 60, the tip of the medium P2 is hardly bent, thereby making it possible to prevent occurrence of paper feed failure such as jamming of the medium P2 when the medium P2 is fed.

Since the rotation mechanism 70 includes the roller 71, the pinion gear 73, and the rack gear 74, with a relatively simple configuration, the roller 71 can be rotated to rotate the roll P2*a* when the second feed tray 61 is removed from the housing 60.

Since the second feed tray 61 includes the tray main body 61*a* and the support base 61*b*, and the roller 71 is supported by the tray main body 61*a*, the roll P2*a* of the medium P2 placed on the support base 61*b* can be rotated by the roller 71 when the second feed tray 61 is removed from the housing 60.

Since the tray main body 61*a* is configured to be able to accommodate the cut sheet paper in a state where the support base 61*b* is removed, it is also possible to feed the cut sheet paper.

Since the pinion gear 73 has a diameter smaller than that of the roller 71, the pinion gear 73 can rotate relatively more than the roller 71 even though a moving distance when the second feed tray 61 is removed from the housing 60 is short. Therefore, the roller 71 can also rotate by the desired number of times, such that the roll P2*a* can rotate by the required number of times.

The roller 71 is disposed at the separation position when the rack gear 74 and the pinion gear 73 are not engaged with each other, and is located at the contact position from the separation position when the rack gear 74 and the pinion gear 73 are engaged with each other. Accordingly, in the fully installed state of the second feed tray 61, since the roller 71 is disposed at the separation position, a conveyance load caused by the roller 71 is not generated when the medium P2 is fed.

The rotation mechanism 70 includes the power transmission device 72, thereby making it possible to prevent the tip of the medium P2 from moving and contacting the housing 60 and the like when the second feed tray 61 is installed to the housing 60.

The rotation mechanism 70 rotates the roll P2*a* so that the tip of the medium P2 when the second feed tray 61 is removed from the housing 60 is disposed below the upper end of the tip portion of the second feed tray 61 (the rear end portion in FIG. 5) when the second feed tray 61 is installed to the housing 60. Accordingly, when the second feed tray 61 is reinstalled to the housing 60, the tip of the medium P2 becomes more difficult to contact the housing 60 and the like.

While the illustrative embodiments of the present disclosure have been described above, the present invention is not limited to the illustrative embodiments, and various modifications can be made without departing from the scope of the claims. For example, the feed device 3 is an additional device installable to and removable from the printer main body 2, but may be integrated with the printer main body 2 and fixed thereto. The housing 11 and the first feed tray 15 of the printer main body 2 may be provided with the rotation mechanism similar to the rotation mechanism 70, and the feed device may be provided in the printer main body 2 itself. In this case as well, the same effect as that of the illustrative embodiments can be obtained.

While the rotation mechanism 70 includes the roller 71, the pinion gear 73, and the rack gear 74, the rotation mechanism 70 may have any configuration and is not particularly limited as long as it is possible to rotate the roll P2*a* so that the medium P2 is rerolled to the roll P2*a* when the second feed tray 61 moves forward from the state of being installed to the housing 60 and is removed therefrom. For example, when the second feed tray 61 moves forward, the outer peripheral surface of the roller that contacts below the outer peripheral surface P2*a*1 of the roll P2*a* contacts the housing 60, such that the roller may rotate to rotate the roll P2*a*. In this manner, it may not be required to include the pinion gear 73 and the rack gear 74.

The second feed tray 61 may not include the support base 61*b*. In this case, a shaft portion may be provided at the center of the roll P2*a* of the medium P2, and the shaft portion may be rotatably supported by the tray main body 61*a*. The support base 61*b* may be fixed to the tray main body 61*a*. The presser 61*c* may not be provided in the tray main body 61*a*. The presser 61*c* may be provided in the housing 60, and can obtain the same effect as described above.

The pinion gear 73 may have a diameter equal to or larger than that of the roller 71. In this case, the pinion gear 73 is desirably disposed at a position where the pinion gear 73 does not contact the roll P2*a*. The roller 71 may be located only at the contact position. In this case, it is desirable that the pinion gear 73 and the rack gear 74 are not engaged with each other in a state where the second feed tray 61 is fully installed to the housing 60. By doing so, even though the roll P2*a* and the roller 71 are in contact with each other, the roller 71 can be rotated by the rotation of the roll P2*a*, such that a conveyance load caused by the roller 71 can be prevented when the medium P2 is fed.

The rotation mechanism 70 may not include the power transmission device 72. In this case, the medium P2 is rolled up when the second feed tray 61 is removed from the housing 60 until the tip of the medium P2 contacts the housing 60 and the like. Accordingly, it is possible to prevent the tip of the medium P2 from contacting the housing 60 and the like when the second feed tray 61 is installed to the housing 60.

As long as the rotation mechanism 70 can rotate the roll P2*a* to roll back the medium P2 when the second feed tray 61 is removed from the housing 60, the tip of the medium P2 may be disposed slightly above the upper end of the tip portion of the second feed tray 61 when the second feed tray 61 is installed to the housing 60. In this case as well, when the second feed tray 61 is reinstalled to the housing 60, the tip of the medium P2 hardly contacts the housing 60 and the like, such that the tip thereof is hardly bent.

Hereinabove, the illustrative embodiments describe an example in which the present invention is applied to a printer that performs recording on the paper P, and are not limited thereto. The present invention can be applied to the entire feed device that rotatably accommodates the roll P2*a* of the medium P2.

What is claimed is:

1. A feed device comprising:

a feed tray configured to accommodate a roll, in which a medium is rolled in a roll shape, rotatably;

a housing configured to support the feed tray movably; and a pull-back mechanism configured to pull back the medium unrolled from the roll in conjunction with movement of the feed tray.

2. The feed device according to claim 1, wherein the pull-back mechanism comprises a rotation mechanism that is rotatable so as to pull back the medium unrolled from the roll in conjunction with the movement of the feed tray.

3. The feed device according to claim 2, wherein the rotation mechanism rotates the roll so that the medium unrolled from the roll is rerolled to the roll.

4. The feed device according to claim 3, wherein the rotation mechanism comprises:

a roller that is rotatably supported by the feed tray and is configured to rotate the roll by being rotated with contacting an outer peripheral surface of the roll;

a pinion gear configured to transmit a rotational force to the roller; and a rack gear that is provided in the housing and is engaged with the pinion gear so as to rotate the pinion gear in accordance with the movement of the feed tray.

5. The feed device according to claim 4, wherein the feed tray comprises:

a tray main body; and a support base that is disposed on the tray main body and is configured to support the outer peripheral surface of the roll from below, and wherein the tray main body is configured to support the roller so that the roller is rotatable while contacting a lower part of the outer peripheral surface of the roll.

6. The feed device according to claim 5, wherein the tray main body comprises a presser configured to press the roll toward the support base.

7. The feed device according to claim 5, wherein the support base is configured to be installable to and removable from the tray main body, and wherein the tray main body is configured to accommodate cut sheet paper in a state the support base is removed.

8. The feed device according to claim 4, wherein the pinion gear has a diameter that is smaller than a diameter of the roller.

9. The feed device according to claim 4, wherein the roller is supported to be movable between:

a separation position at which the roller is separated from the outer peripheral surface of the roll; and a contact position at which the roller contacts the outer peripheral surface of the roll.

10. The feed device according to claim 9, wherein the feed tray is movable between a first position and a second position, the second position being outward from the housing than the first position, wherein in a case the feed tray is in a first state where the feed tray is installed to the housing at the first position, the rack gear is disposed to be not engaged with the pinion gear, wherein in a case the feed tray is in a second state, which is a state where the feed tray is at a position between the first position and the second position, the rack gear is disposed to be engaged with a lower part of the pinion gear, wherein in a case the rack gear and the pinion gear are not engaged with each other, the roller is disposed at the separation position, and wherein in a case the rack gear and the pinion gear are engaged with each other, the roller is located from the separation position to the contact position.

11. The feed device according to claim 4, wherein the rotation mechanism further comprises a power transmission device configured to transmit the rotational force from the pinion gear to the roller, and wherein the power transmission device is configured to:

in a case the feed tray is moved with respect to the housing, transmit the rotational force of the pinion gear, which rotates by the engagement between the pinion gear and the rack gear, to the roller; and in a case the feed tray is installed to the housing, not to transmit the rotational force of the pinion gear, which rotates by the engagement between the pinion gear and the rack gear, to the roller.

12. The feed device according to claim 3, wherein the rotation mechanism is configured to rotate the roll so that a tip of the medium in a case the feed tray is moved with respect to the housing, is disposed below an upper end of a tip portion of the feed tray in a case the feed tray is installed to the housing.

* * * * *